Aug. 5, 1941.   J. S. KAMBORIAN   2,251,285
LASTING MACHINE
Filed Aug. 14, 1940   12 Sheets-Sheet 5

Inventor
Jacob S. Kamborian
by Roberts Cushman & Woodbury
Att'ys.

Aug. 5, 1941.　　J. S. KAMBORIAN　　2,251,285
LASTING MACHINE
Filed Aug. 14, 1940　　12 Sheets-Sheet 6

Inventor
Jacob S. Kamborian
by Roberts, Cushman & Woodberry
Att'ys.

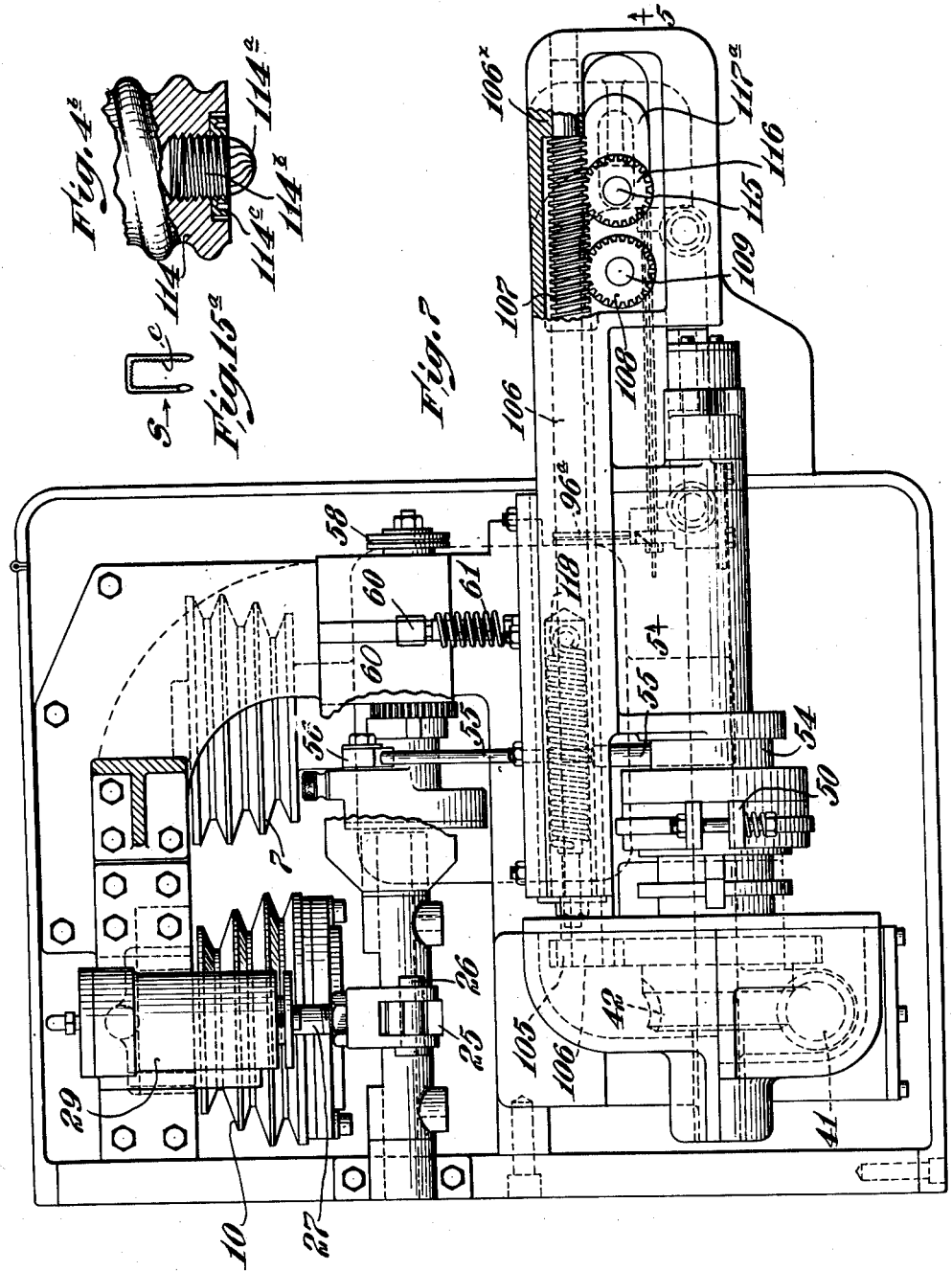

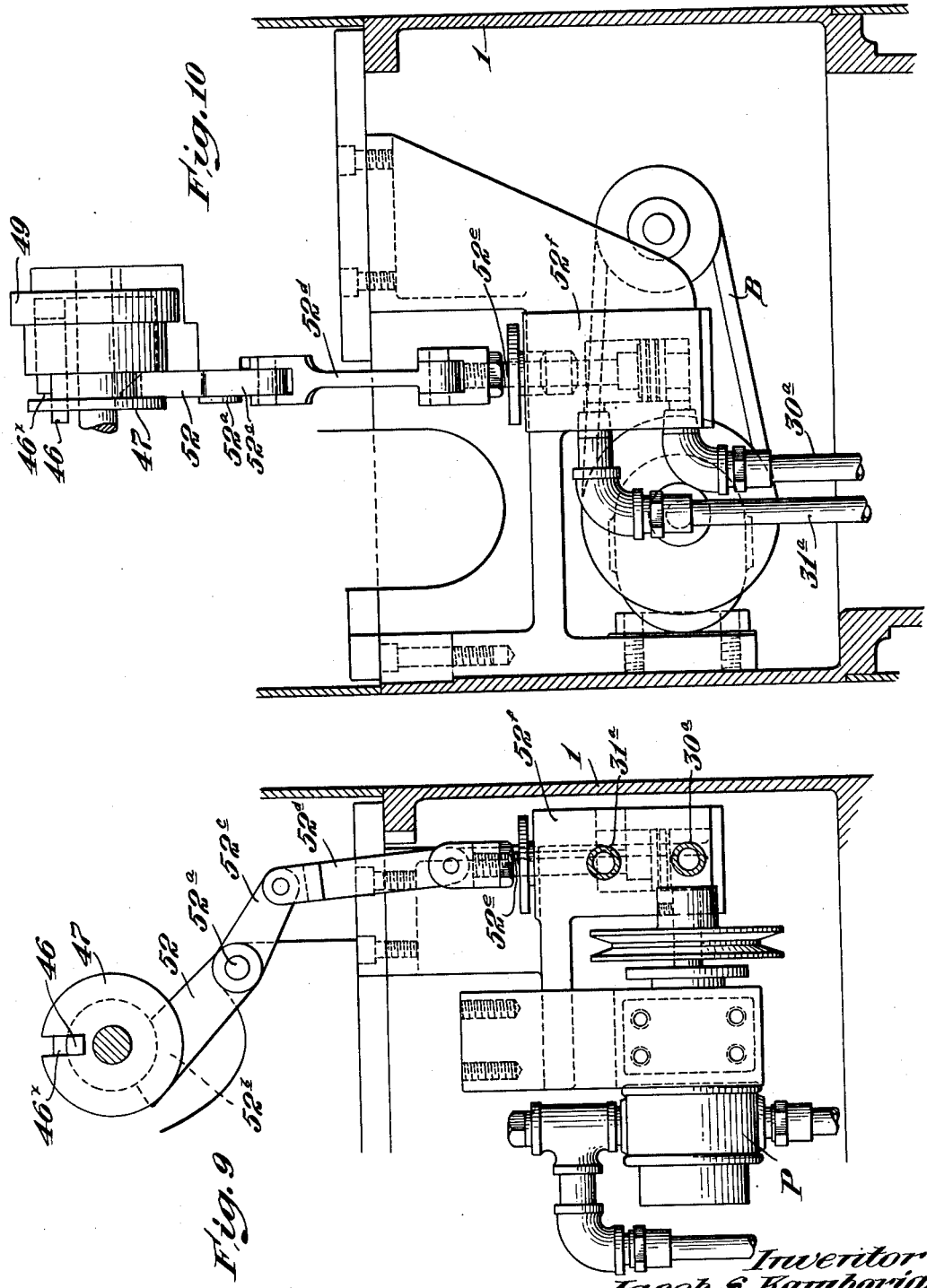

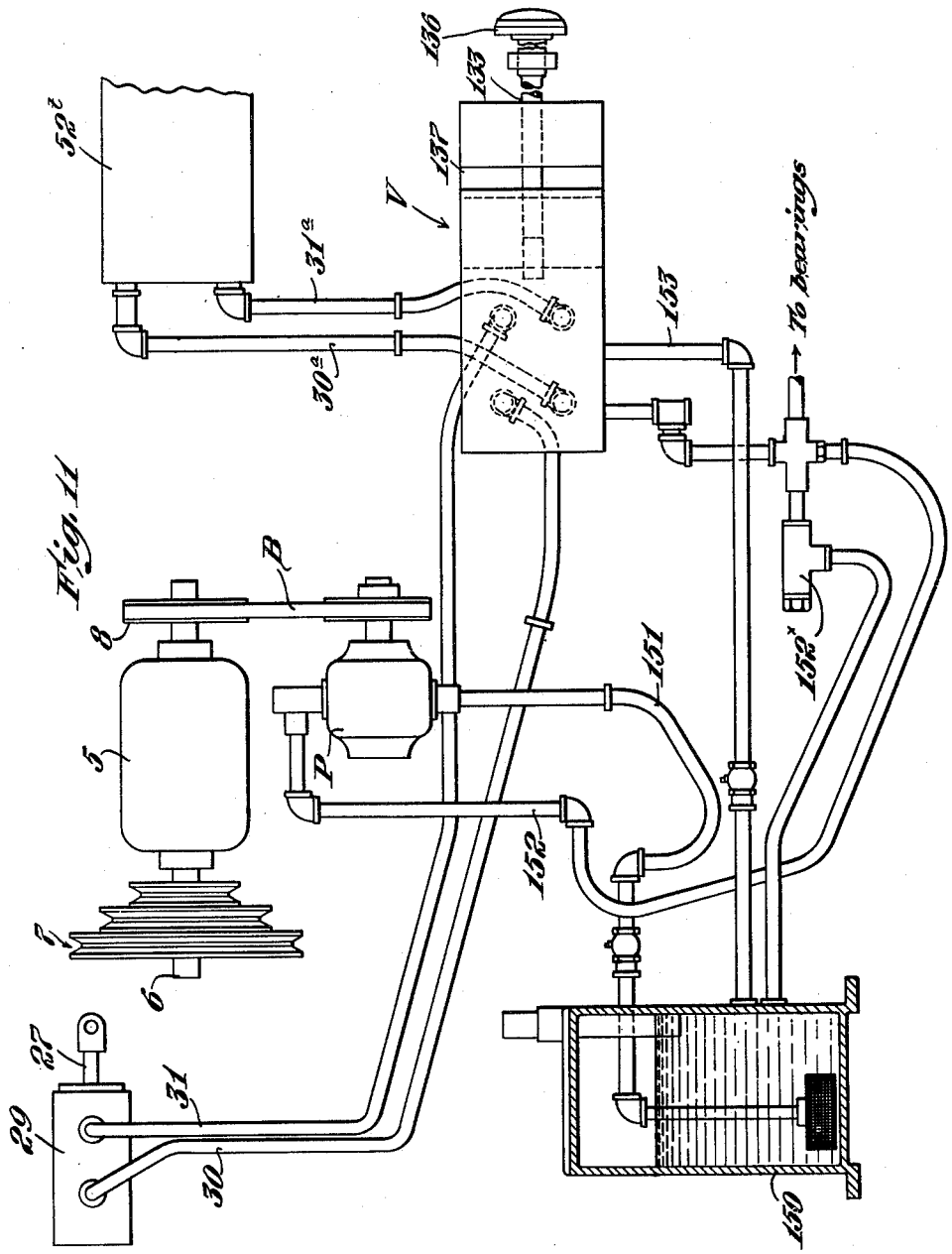

Aug. 5, 1941.  J. S. KAMBORIAN  2,251,285
LASTING MACHINE
Filed Aug. 14, 1940  12 Sheets-Sheet 10
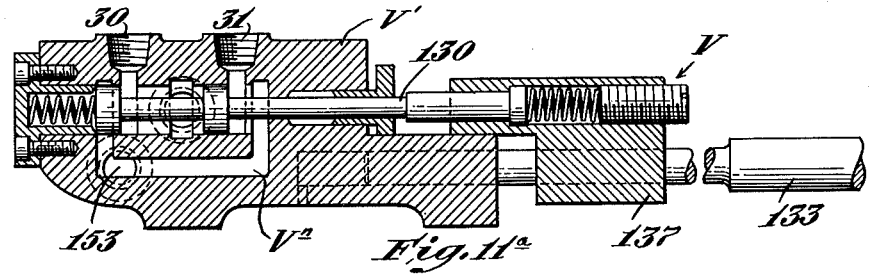
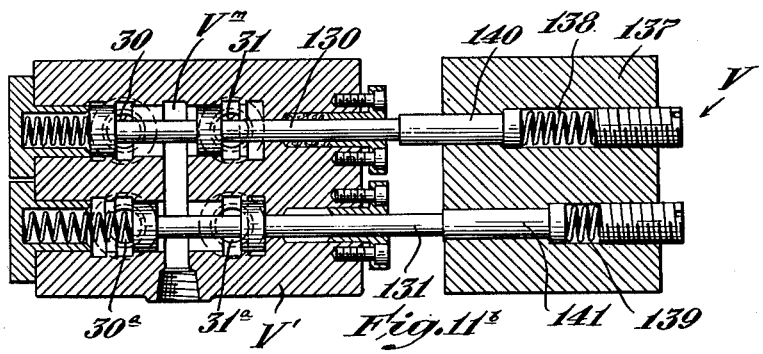
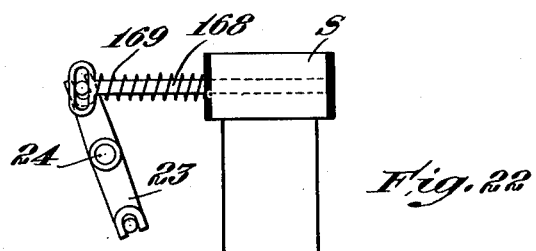
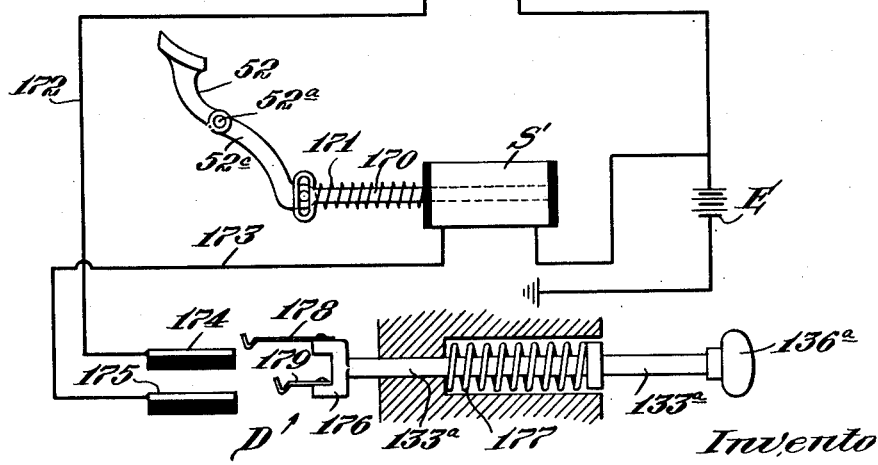
Inventor
Jacob S. Kamborian
by Roberts Cushman & Woodberry
att'ys.

Aug. 5, 1941.  J. S. KAMBORIAN  2,251,285
LASTING MACHINE
Filed Aug. 14, 1940  12 Sheets-Sheet 11
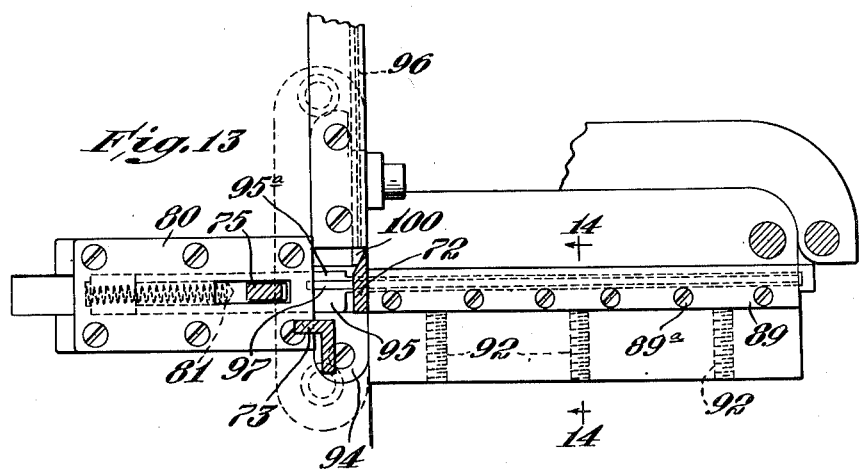
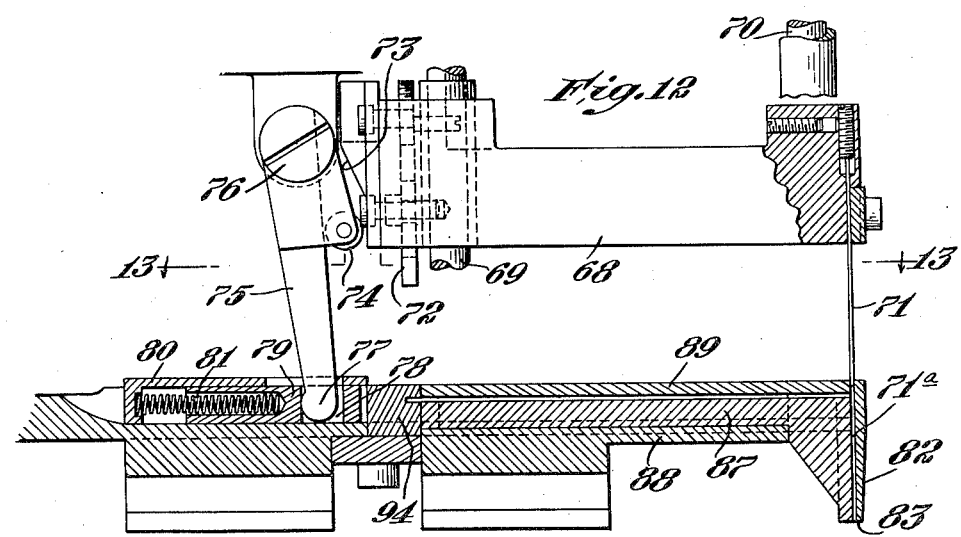
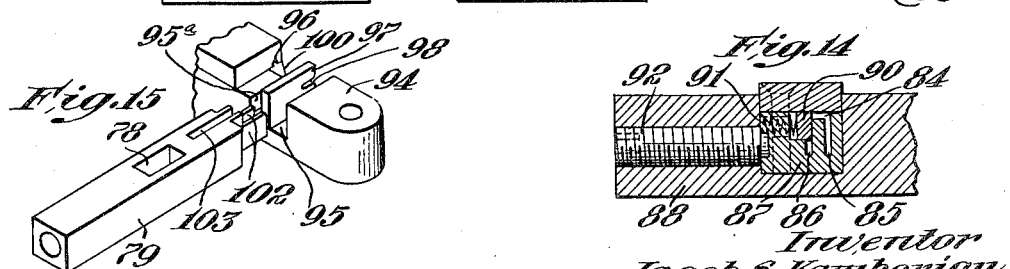
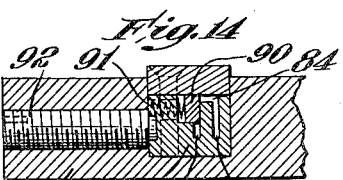
Inventor
Jacob S. Kamborian
by Roberts Cushman & Woodberry
att'ys Aug. 5, 1941. J. S. KAMBORIAN 2,251,285
LASTING MACHINE
Filed Aug. 14, 1940 12 Sheets—Sheet 12
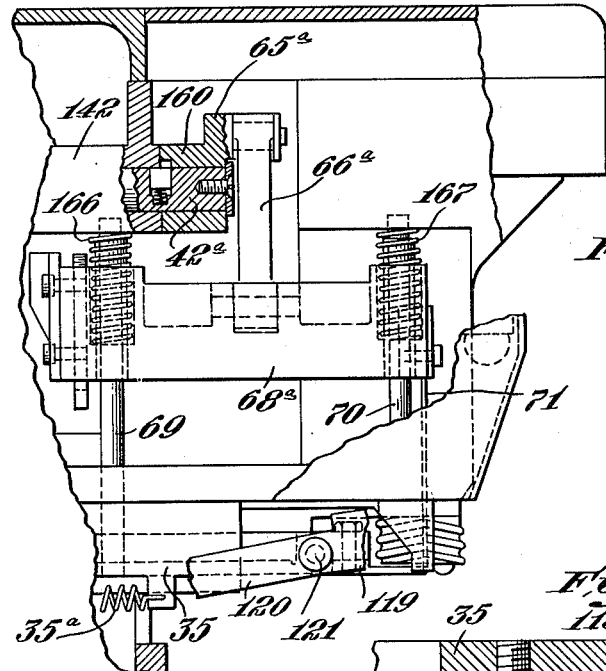
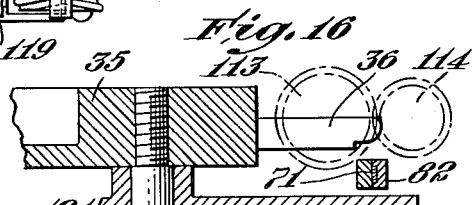
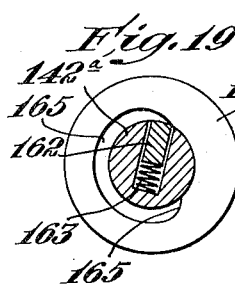 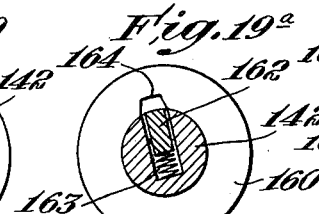 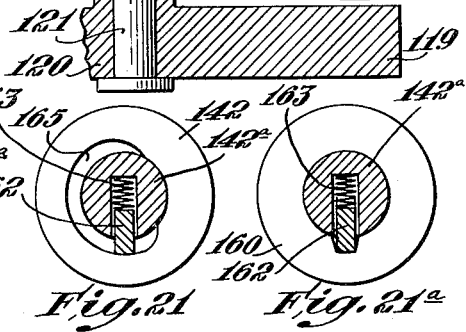
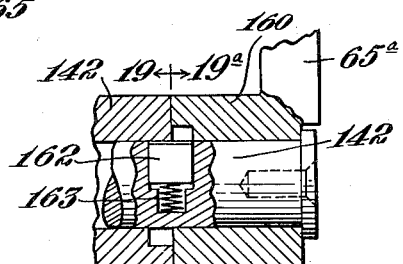 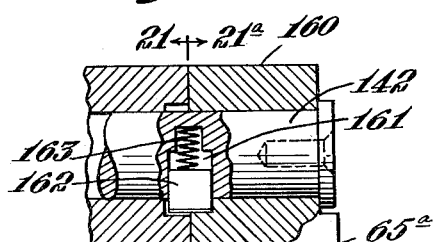
Inventor
Jacob S. Kamborian
by Roberts Cushman Woodberry
Att'ys.

Patented Aug. 5, 1941

2,251,285

UNITED STATES PATENT OFFICE 2,251,285

LASTING MACHINE

Jacob S. Kamborian, West Newton, Mass., assignor to General Research, Inc., Boston, Mass., a corporation of Massachusetts Application August 14, 1940, Serial No. 352,479

22 Claims. (Cl. 12—2)

This invention pertains to the manufacture of footwear and relates more especially to a new and improved machine for lasting shoes or the like, the present invention being an improvement upon that disclosed in the copending application for Letters Patent, Serial No. 212,236, filed by Jacob S. Kamborian on June 7, 1938.

The aforesaid application discloses a novel method of lasting shoes which involves gripping a small portion of the marginal material of the upper at a selected point, applying lasting stress at such point in a direction such as to stretch the upper snugly about the last, progressively advancing the place of application of such stress successively from point to point for any desired distance peripherally of the shoe bottom while at every instant of such advance keeping a portion of the margin under lasting stress, and, as the place of application of stress advances, successively relieving the lasting stress on the parts of the margin just previously stressed; and wiping in each successively stressed portion of the margin to overlie the last bottom.

The aforesaid application also discloses the desirability of permanently securing the upper to the insole as fast as it is so progressively wiped in and suggests the employment of adhesive and/or metallic fasteners, for example wire staples.

The present invention has for its principal object the provision of novel and improved mechanism and means useful in the performance of a lasting operation having the general characteristics just above referred to.

A further object is to provide lasting apparatus comprising upper stressing and wiping means together with means for causing the wiped-in material to be adhesively united to the insole. A further object is to provide a machine in which the in-wiping is accomplished by the operation of a wiper which vibrates at high speed while its point of action progresses along the periphery of the shoe. A further object is to provide lasting apparatus comprising upper stressing and wiping means, together with means for inserting metallic fasteners, for instance staples, into the wiped-in material.

A further object of the invention is to provide a lasting machine capable of securing the wiped-in marginal material, either by adhesive or individual fasteners, with provision for causing one or the other of said means to operate at will. A further object is to provide a lasting machine having upper stressing and wiping means with provision for applying heat to the wiped-in material, thereby to set it in wiped-in position.

A further object is to provide a machine for lasting shoes, capable of operating at extremely high speed; to provide a machine capable of lasting a shoe, beginning at one point in the periphery of the shoe bottom and continuing about the entire periphery without stopping, if desired; and to provide a machine of simple, dependable, durable, but inexpensive type.

Other and further objects and advantages of the invention will be pointed out in the following more detailed description and by reference to the accompanying drawings, wherein—

Figure 1:
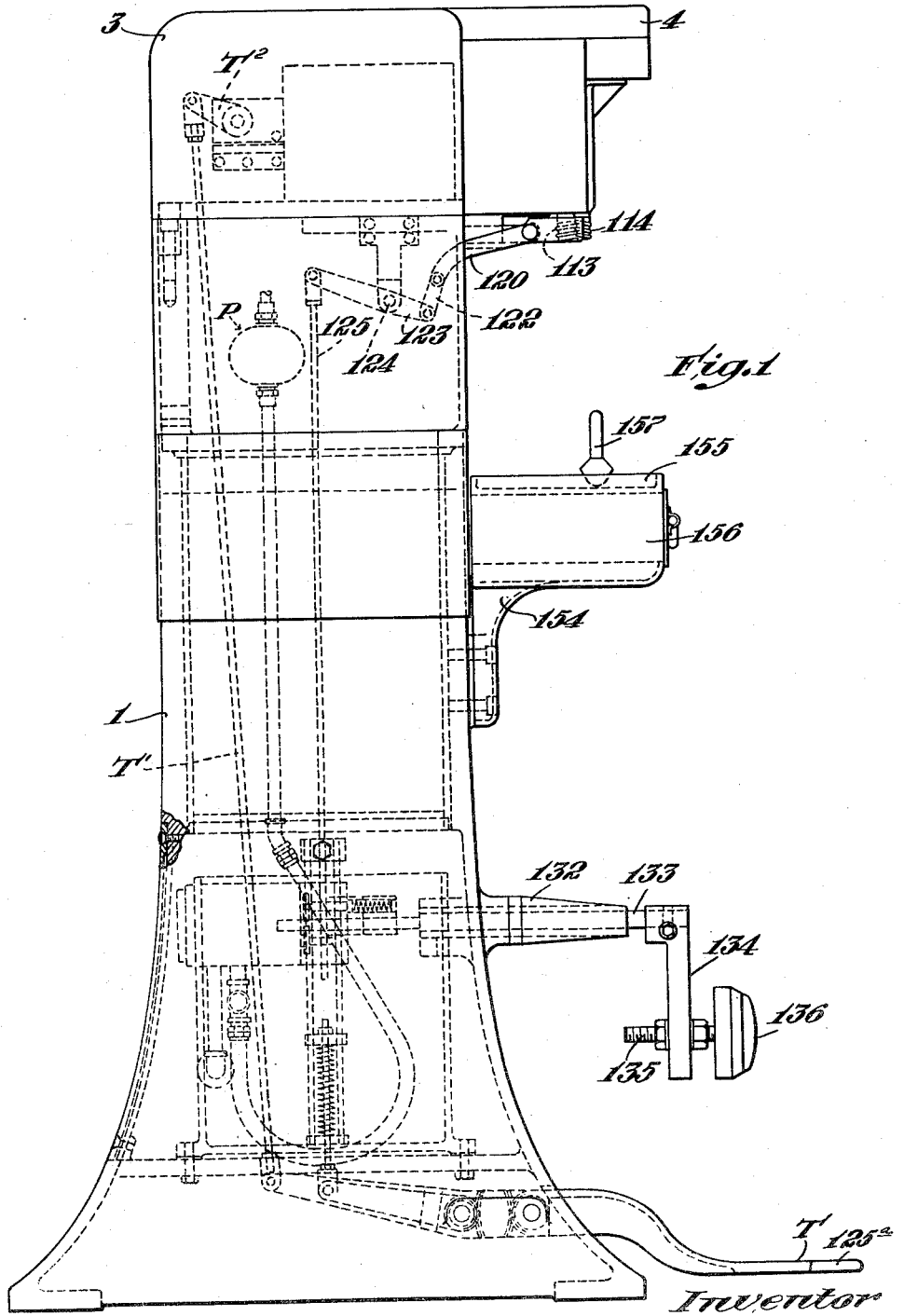
Fig. 1 is an elevation of the left-hand side of the machine.
Figure 2:
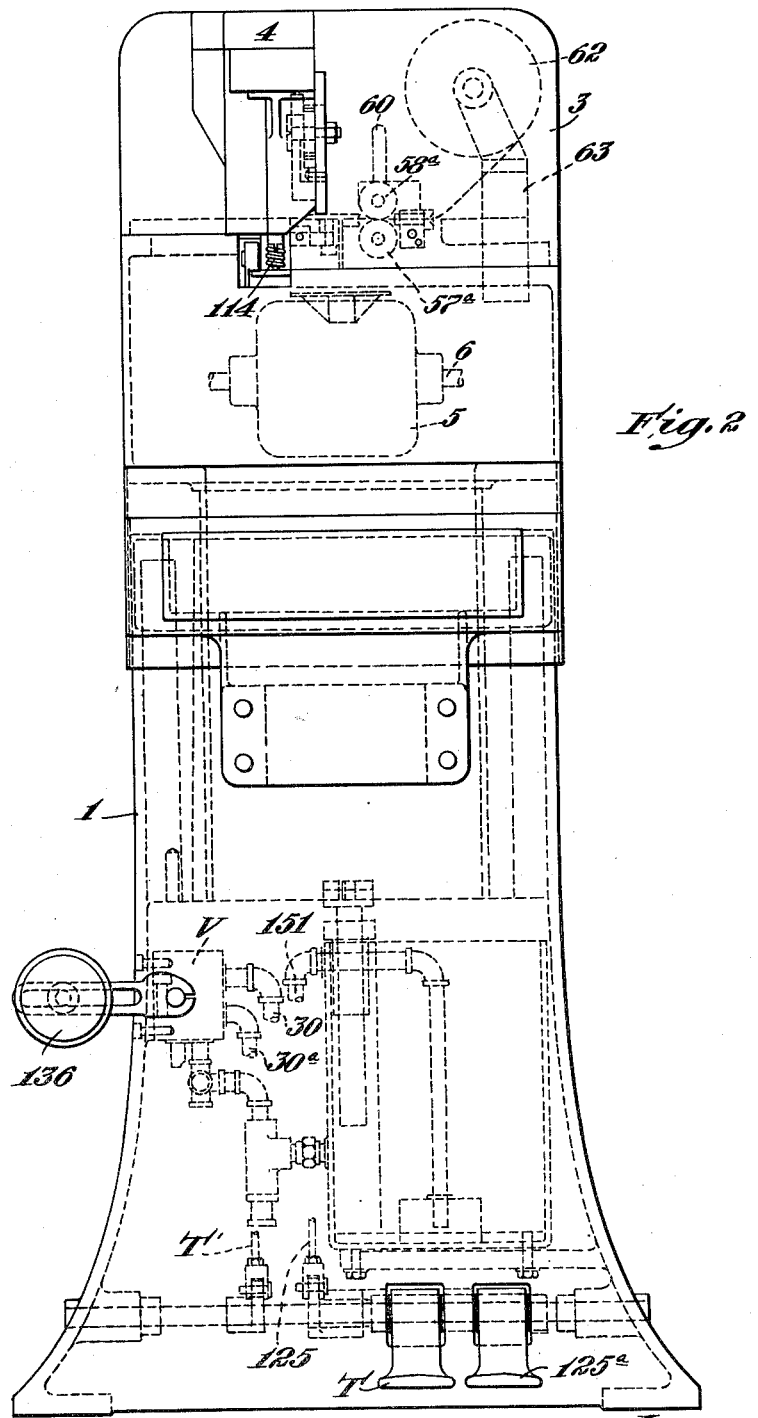
Fig. 2 is a front elevation of the machine.
Figure 3:
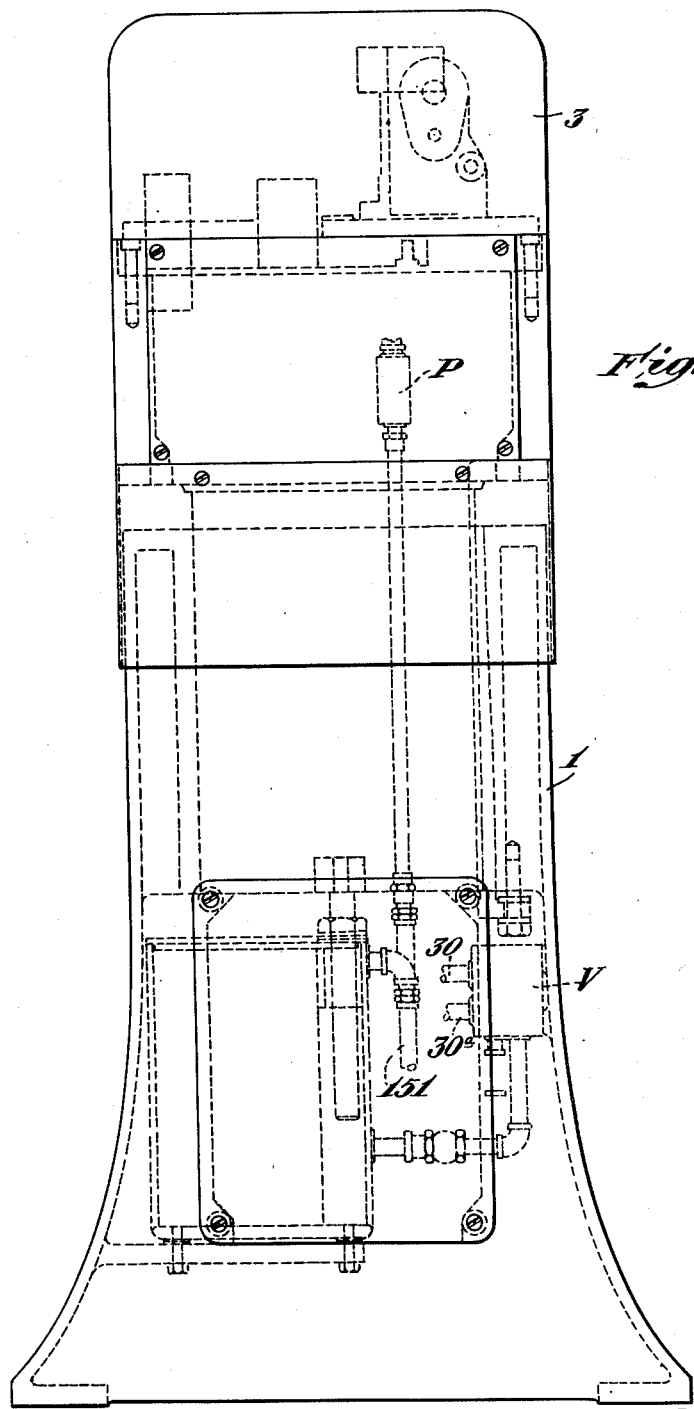
Fig. 3 is a rear elevation of the machine.
Figure 4:
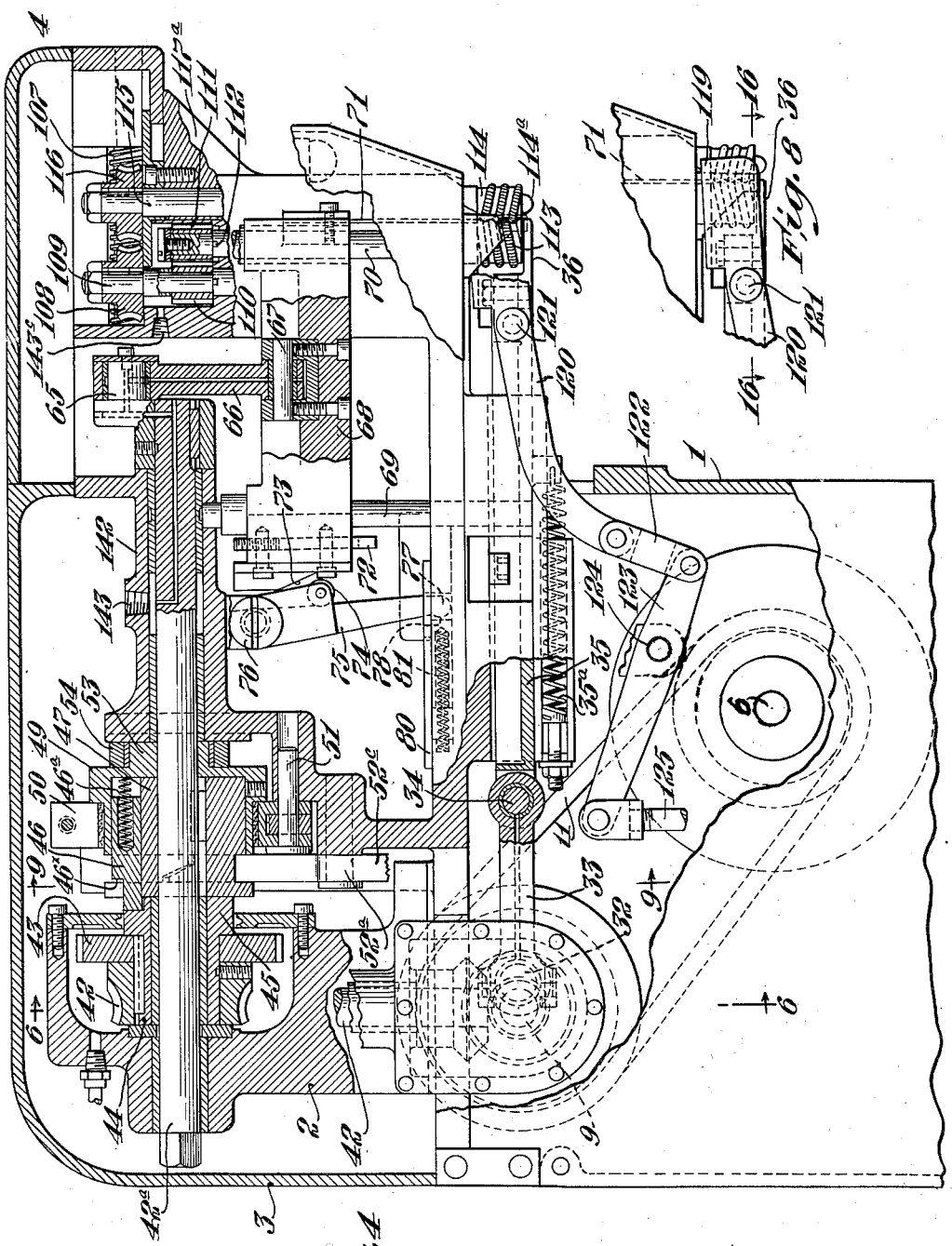
Fig. 4 is a fragmentary view to larger scale of the upper part of the machine, as shown in Fig. 1, with certain parts in vertical section.
Figure 5:
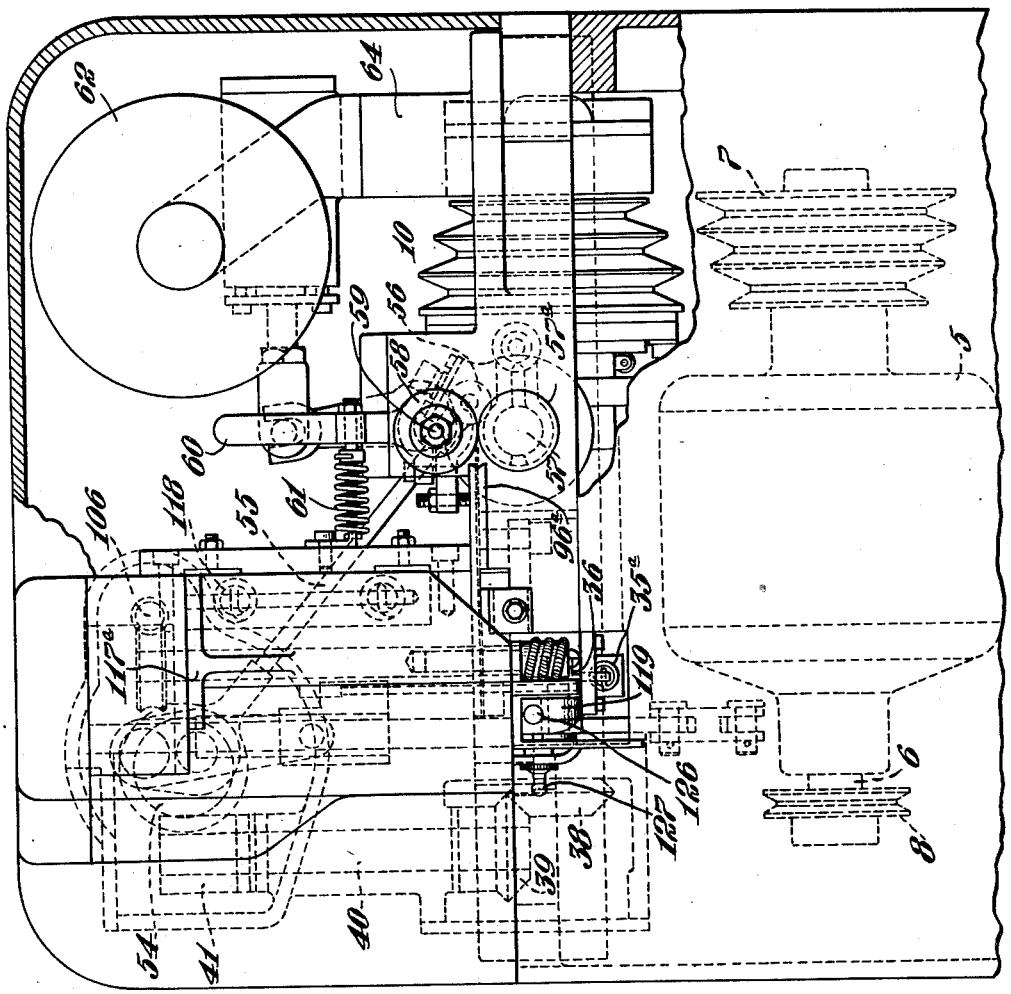
Figure 6:
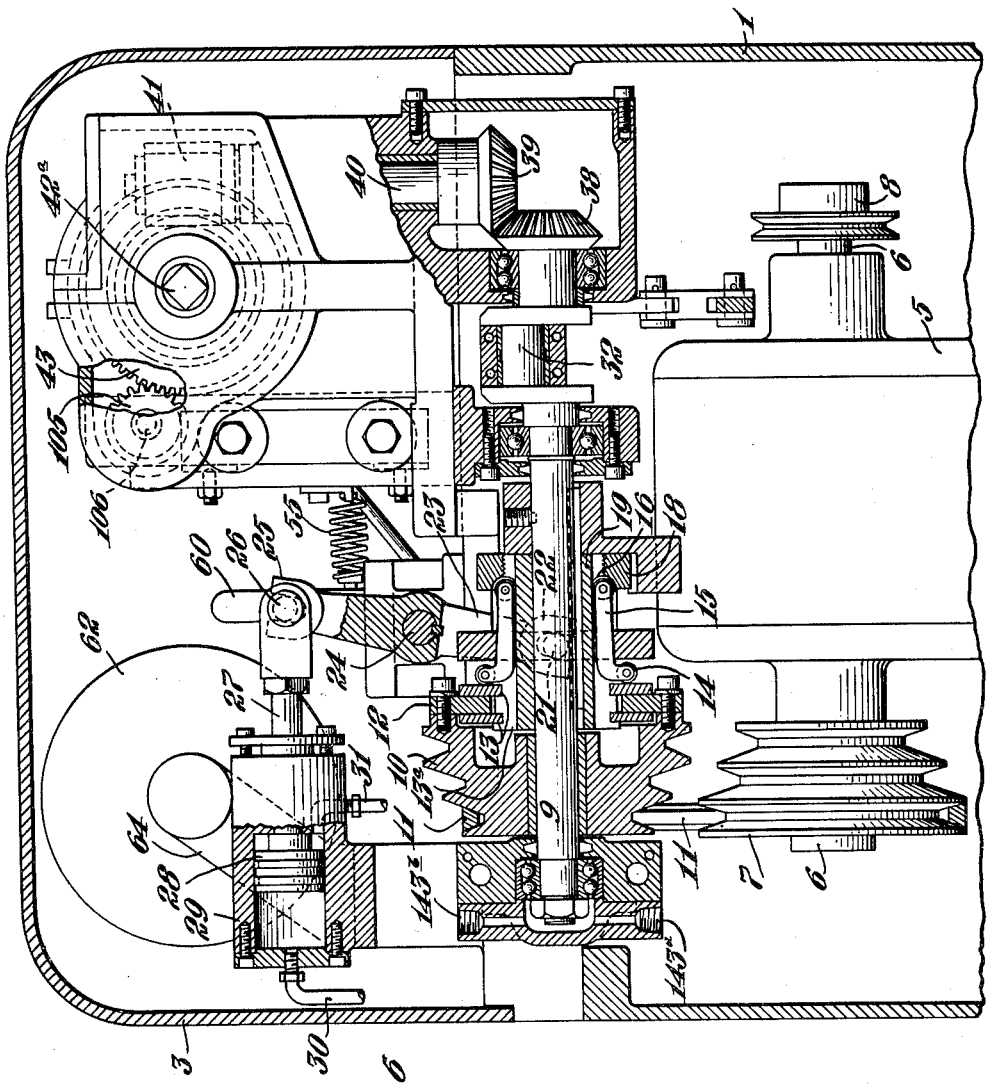

Fig. 4$^b$ is a fragmentary elevation, partly in vertical section, and to large scale, showing details of the front gripping roll of Fig. 4;

Fig. 5 is a front elevation to larger scale than Fig. 2, of the front of the upper portion of the machine, with certain parts in vertical section;

Fig. 6 is a fragmentary vertical section substantially on the line 6—6 of Fig. 4;

Fig. 7 is a plan view of the machine to larger scale than Fig. 1, with a portion of the cover removed and with certain parts in horizontal section;

Fig. 8 is a fragmentary elevation showing the pressing wiper in inoperative position;

Fig. 9 is a fragmentary elevation substantially on the plane of the line 9—9 of Fig. 4, showing clutch-actuating mechanism;

Fig. 10 is an elevation showing the mechanism of Fig. 9 viewed from the right-hand side of the latter;

Fig. 11 is a diagrammatic view illustrative of the hydraulic control system whereby the various operations of the machine are determined at the will of the operator;

Fig. 11$^a$ shows the control valve of Fig. 11 in vertical section;

Fig. 11$^b$ is a horizontal section of the valve of Fig. 11$^a$;

Fig. 12 is a fragmentary elevation, partly in vertical section, illustrating details of fastener-inserting means;

Fig. 13 is a fragmentary plan view of the fastener-inserting means of Fig. 12, with certain parts in horizontal section substantially on the line 13—13 of Fig. 12;

Fig. 14 is a fragmentary section, to larger scale, on the line 14—14 of Fig. 13;

Fig. 15 is a fragmentary perspective view illustrating portions of the fastener-forming and feeding mechanism;

Fig. 15a is an elevation of a desirable form of staple;

Fig. 16 is a horizontal section to large scale, substantially on the line 16—16 of Fig. 8;

Fig. 17 is a fragmentary vertical section illustrating a modified form of fastener-inserting means;

Fig. 18 is a fragmentary section to somewhat larger scale than Fig. 17, illustrating details of a clutch element forming a part of the fastener-driving mechanism shown in Fig. 17;

Fig. 19 is a section on the line 19—19 of Fig. 18, looking toward the left;

Fig. 19a is a section on the line 19a—19a of Fig. 18, looking toward the right;

Fig. 20 is a view similar to Fig. 18 but showing the parts differently positioned;

Fig. 21 is a section on the line 21—21 of Fig. 20, looking toward the left;

Fig. 21a is a section on the line 21a—21a of Fig. 20, looking toward the right; and Fig. 22 is a diagrammatic view illustrative of electrical means for controlling the drive clutch.

Referring to the drawings the machine of the present invention is illustrated as having its operative parts mounted upon and partly within a hollow post or standard 1, in the upper part of which is secured the frame 2 (Fig. 4) which is provided with bearings and guiding elements as hereinafter more fully described, for moving parts of the mechanism. Preferably, though not necessarily, the upper part of the machine has a hollow cover or cap preferably comprising several independent portions 3, 4 etc., such cap or cover serving to protect the moving parts from dust and dirt and also to reduce the noise when the machine is in operation.

As herein disclosed a drive motor 5 (Fig. 6) for example, an electric motor, is housed within the hollow post or standard 1. However, it is to be understood that this motor may be mounted outside of the post, for example upon a bracket carried upon the post, if such arrangement be preferred. The motor 5 has a shaft 6 to which is secured a pulley 7, here shown as a step pulley having a plurality of belt-receiving grooves. At the opposite end of the shaft 6 is arranged a pulley 8 (Fig. 11) designed to receive a belt B for driving an oil pump P as hereinafter referred to.

The main drive shaft 9 (Fig. 6) of the machine is arranged parallel to the shaft 6 and has bearings within the frame 2. Preferably the bearings for this shaft are anti-friction bearings, it being understood that other types of bearings may be employed and further that anti-friction bearings may desirably be employed at other parts of the machine for reducing friction. It is further to be noted that the bearings of the principal moving parts at least of the machine, have provision for forced lubrication as hereinafter more fully described so as to reduce the power required for driving the machine to a minimum.

On the shaft 9 (Fig. 6) there is mounted a step pulley 10 having its grooves arranged in the vertical planes of the corresponding grooves of the pulley 7, the pulley 10 being driven by means of a belt 11 from the pulley 7. The pulley 10 is normally loose on the shaft 9 but is provided with an annulus 12 which is disposed between a pair of axially movable clutch rings 13. The right-hand clutch ring 13 (Fig. 6) is engaged by rollers on the ends of clutch-actuating rods 15 whose opposite ends are also provided with rollers 16 which are engaged by a ring 18 secured to a clutch sleeve 19. This sleeve 19 is fixed to the shaft 9 and has diametrically disposed splines 13a which engage slots in the inner edges of the rings 13. The sleeve 19 is provided with a pair of outwardly projecting diametrically disposed pins 21 which are received in forks 22 at the lower end of a lever 23 which is pivotally mounted at 24 upon the frame and which has an upwardly directed arm also having forks 25 at its end which receive a pin 26 carried by a piston rod 27 secured to a piston 28 which slides in a cylinder 29 (Figs. 6 and 11), the piston and cylinder constituting a fluid motor device whereby the sleeve 19 may be shifted so as to press one of the rings 13 against flange 12 and thereby clutch the shaft 9 to the pulley 10. Suitable conduits 30 and 31 lead into the cylinder 29 at opposite sides of the piston and these conduits are connected to a valve V (Figs. 11, 11a and 11b) hereinafter more fully described.

The drive shaft 9 is provided with a crank 32, or its equivalent, which receives one end of the connecting rod 33 (Fig. 4) whose opposite end is pivotally connected at 34 to a slide member 35 (Figs. 4 and 16) arranged to reciprocate in a horizontal path in a suitable guideway in the machine frame and which is provided at its forward end with the in-wiping wiper member 36. A spring 35a connected to the slide 35 constantly tends to retract the wiper 36, that is to say, to move it to the left as viewed in Fig. 4, thus in part, at least, to counterbalance the inertia of the moving parts and to take up wear and prevent undue vibration and chatter.

The right-hand end of the drive shaft 9, as viewed in Fig. 6, is provided with a bevel pinion 38 which meshes with a pinion 39 on a vertical shaft 40 having bearings in the machine frame and provided at its upper end with a worm 41 (Figs. 6 and 7). The worm 41 meshes with a worm wheel 42 (Figs. 4 and 7) which is coaxial with a secondary drive shaft 42a mounted in bearings in the machine frame and disposed above and at right angles to the axis of the shaft 9. A pinion 43 is associated with the worm wheel 42 and turns with the latter, the worm and pinion being keyed to a sleeve 44 which normally turns freely on the shaft 42a. The sleeve 44 is provided with one element 45 of a clutch device. This clutch device comprises the axially movable clutch pin 46 (Figs. 4, 9 and 10) which slides in a sleeve 47, being urged outwardly to the left (Fig. 4) by spring 46a. The sleeve 47 is keyed to the shaft 42a and is disposed within and fixed to the outer clutch housing 49. The outer surface of the housing 49 constitutes a brake drum for engagement by a pair of brake arms 50 (Figs. 4 and 7) pivoted at 51 to the frame. The brake arms oppose rotary movement of the drum and thus stop it quickly when the clutch is disengaged. When the pin 46 is projected by the spring 46a into engagement with the part 45, the latter, together with worm wheel 42 and pinion 43, are locked to the shaft 42a. When so locked together the rotation of the worm wheel 42 causes the shaft 42a to turn in timed relation to the main drive shaft 9.

For stopping the shaft 42a, a clutch release lever 52 is provided, said lever being pivoted at 52ᵃ (Figs. 4, 9 and 10) and having a wedge element 52ᵇ at its upper end which is engageable by a shoulder 46ˣ of the pin 46 as the shaft rotates (provided the lever 52 is in the stopping position), thereby forcing the pin to the right (Fig. 4) and disengaging it from the part 45. The lever 52 has a lower arm 52ᶜ (Figs. 9 and 10) pivotally connected to a link 52ᵈ which in turn is connected to the upper end of a piston rod 52ᵉ secured to a piston within a cylinder 52ᶠ mounted within the hollow post 1 and having pipes 30ᵃ and 31ᵃ which enter its opposite ends, said pipes extending to the casing of the valve V (Fig. 11).

When pressure fluid is admitted through pipe 30ᵃ to the cylinder 52ᶠ, the piston rises and thereby swings the lever 52 so as to withdraw the wedge 52ᵇ out of its engagement with shoulder 46ˣ of pin 46, thus allowing the spring 46ᵃ to project the pin and connect shaft 42ᵃ to the worm wheel 42. However, when pressure fluid is admitted through pipe 31ᵃ to the cylinder 52ᶠ, the piston is forced down, causing the lever 52 to swing the wedge 52ᵇ into the path of the part 46ˣ, thereby retracting the pin and causing shaft 42ᵃ to stop.

The right-hand end of the clutch housing 49 (Fig. 4) is shaped to constitute an eccentric 53 which is embraced by an eccentric strap 54 which is connected by an eccentric rod 55 to a rocker element 56 (Fig. 5) constituting a part of the wire feed mechanism. This rocker 56 is provided with a roller clutch or ratchet device (not shown) by means of which the shaft 57 is turned forward intermittently. Fixed to this shaft is the lower feed roll 57ᵃ. An eccentric stud 58, above the shaft 57ᵃ, carries a stud shaft 59 on which turns the upper roll 58ᵃ. The eccentric stud 59 is provided with an actuating lever 60 which is urged to the left (Fig. 5) by a spring 61 which thus tends to force the upper roll 58ᵃ downwardly toward the lower feed roll 57ᵃ so as to grip the wire between them. However, by moving the lever 60 to the right (Fig. 5) the grip of the upper roll against the wire may be released thereby to facilitate manual adjustment of the wire or to permit a new length of wire to be inserted readily between the rolls. Preferably the rolls 57ᵃ and 58ᵃ have grooved peripheries in order properly to guide the wire and to obtain a firm grip thereon. The wire for forming the staples may be carried by a drum or reel 62 supported by a bracket 63 forming a part of the frame 2. This drum or reel may be furnished with any usual or desirable type of brake or friction device (not shown) to prevent the reel from turning too freely. The wire leads from this reel or drum downwardly and between the rolls 57ᵃ and 58ᵃ and is thence delivered to the staple-forming means hereinafter more fully described.

The right-hand end of the shaft 42ᵃ, as viewed in Fig. 4, is provided with a crank 65 or its equivalent, to which is connected one end of the connecting rod 66 whose opposite end is pivotally connected, by means of the crank pin 67, to a vertically reciprocating cross-head 68 guided by parallel vertical posts 69 and 70. To the right-hand end of this cross-head, as viewed in Fig. 4, is secured a fastener drive element 71 which may be of conventional type and properly designed to cooperate with the particular form of fastener which is being used. To the opposite end of this cross-head there is secured a cutting and forming die 72 (Figs. 4 and 13). To the latter end of the cross-head is secured a cam 73 which is designed to engage a cam follower roll 74 mounted on a lever 75 pivoted at 76 upon the frame, and whose lower end 77 is disposed within a slot 78 in a fastener-advancing element 79. This fastener-advancing element is mounted to slide in a casing 80 secured to the machine frame and is constantly urged to the right (Fig. 12), that is to say, in the fastener-advancing direction, by means of a spring 81.

The fastener-driving element 71 is arranged to reciprocate in a vertical channel or passage 71ᵃ (Fig. 12) in a driving head 82 whose lower end 83 is intended to engage or to lie immediately above the upper surface of the wiped-in marginal material of the shoe upper. A fastener runway opens into the guide channel 71ᵃ, said runway being of inverted U-shape (Fig. 14) comprising the upper horizontal part 84 and the parallel vertical legs 85 and 86. This runway is partially formed in the driving head 82 and partly in an elongate block 87 which extends from the left-hand side of the head 82 (Fig. 12) to the zone of operation of the fastener-forming means. This block 87 is mounted in a slot in a part 88 of the machine frame and the runway is provided with a removable cover 89 suitably secured to the block 87 by means of screws 89ᵃ or the like. At one side of the runway there is provided a lateral chamber which receives the elongate presser element 90 (Fig. 14) which is urged by springs 91 to the right, as viewed in Fig. 14, the presser member 90 being designed to engage one leg of the staple as it passes along the runway and thus to hold the formed staple under frictional restraint so that the staple will not tend to tip or otherwise become displaced during its passage along the runway. The block 87 is removably held in position in the frame member 88 by means of screws 92.

At the left-hand end of the runway block 87, as viewed in Fig. 14, there is located the lower fixed die block 94 (Fig. 15). This die block is provided with a recess comprising the parts 95 and 95ᵃ, and has a horizontal passage 96 through which the wire enters the part 95ᵃ of the recess about midway of the depth of the latter. The parts 95 and 95ᵃ of the recess are separated by the vertical partition wall or fin 97 which constitutes the lower or fixed shaping die, such partition or fin having a slot 98 (Fig. 15) open at its right-hand end for the passage of the wire. The material of the fin or die member between the slot 98 and the bottoms of the parts 95 and 95ᵃ of the recess constitutes the forming element about which the staple is shaped. Adjacent to the delivery end of the passage 96 there is arranged a cutting edge 100 with which cooperates a corresponding edge of the upper die member 72, said edges acting to cut off the advancing wire on a bevel, so that the formed staple S (Fig. 15ᵃ) will be provided with sharp points. If desired, the dies may be shaped to corregate the inner sides of the staple legs as shown at C (Fig. 15ᵃ). The passage 96 constitutes the terminus of a conduit leading from a point adjacent to the feed rolls 57ᵃ and 58ᵃ, said conduit being formed within a part 96ᵃ (Figs. 5 and 7).

The staple-advancing element 79, (Fig. 15) is provided with a pair of spaced fingers 102 which are designed to enter the parts 95 and 95ᵃ of the recess in block 94 and to push the formed staple from off the fin or die member 97 into the channel in the runway. The member 79 is furnished with a slot 103 which receives the fin 97 and acts as a guide for the advancing member 79 to insure accuracy of entry of the formed staple into the runway. Obviously, if desired, for instance when stapling shoes mounted on wood bottom lasts, the staple-presenting and driving means may be designed to deliver the staples in a direction inclined to the last bottom.

The gear 43 (Fig. 4) above described, which is associated with the worm wheel 42, meshes with a pinion 105 (Figs. 6 and 7) mounted on a shaft 106 which turns in bearings with its axis parallel to the shaft 42$^a$. The shaft 106 (Fig. 7) extends to the front of the machine where it is supported in a bearing at 106$^x$. Adjacent to this latter bearing the shaft 106 is provided with a worm 107 (Fig. 7) which meshes with a worm wheel 108 on a vertical shaft 109 (Figs. 4 and 7). This shaft 109 turns in fixed bearings and is provided with a pinion 110 (Fig. 4) which meshes with a pinion 111 secured to the upper end of a vertical shaft 112 mounted in bearings in the forward upper part of the frame. This portion of the frame extends substantially forward of the front wall of the post or standard 1 so as to present the lasting instrumentalities in proper position for engagement with the shoe, and to furnish sufficient clearance between the post or standard 1 and the shoe. At its lower end the shaft 112 carries the work-gripping roll 113 which is preferably provided with a helical peripheral rib. Cooperating with the roll 113 is a roll 114, preferably of somewhat smaller diameter than the roll 113 and also furnished with a helical peripheral rib. Preferably, the lower end of roll 114 is provided with a rounded or substantially hemispherical boss 114$^a$ designed to engage the bottom of the insole of the shoe being lasted. As shown in detail in Fig. 4$^b$, the boss 114$^a$ has a screw-threaded shank 114$^b$ which fits into an axial bore in the lower end of roll 114, being held in place by a lock nut 114$^c$. Preferably the curved surface of the boss 114$^a$ is fluted or knurled.

As shown, the roll 114 is of smaller diameter than roll 113 to facilitate its passage along the shank and toe portion of the shoe. The helical ribs of the rolls 113 and 114 are of opposite pitch so that when the rolls are turned oppositely and in the proper direction, any material gripped between the rolls is subject to an upward pull.

The roll 114 is fixed to the lower end of a shaft 115 to the upper end of which is secured a worm wheel 116 which is always in mesh with the worm 107. However, the shaft 115 is mounted in bearings carried by a movable slide member 117$^a$ (Fig. 4) which comprises an elongate horizontal portion arranged to slide in guideways within the post or standard and which is constantly urged rearwardly by a pair of springs 118 (Figs. 5 and 7), thus tending to move the rolls 113 and 114 relatively toward each other. On the other hand, the rolls may be moved apart to permit entry of the upper material between them by depressing a treadle T (Fig. 1) whose motion is transmitted by a link T$^1$ to a lever T$^2$ which is so connected (by parts not shown) to the slide member 117$^a$ that clockwise turning of lever T$^2$ (Fig. 1) causes slide 117$^a$ to move to the right, thus separating the rolls.

In accordance with a preferred construction a second or pressing wiper 119 (Figs. 8, 16 and 17) is provided, such wiper being pivotally secured at 121 to the carrier 35 which supports the in-wiper 36. The pressing wiper 119 is secured to a lever 120 whose rear end extends into the interior of the standard 1 and is connected by a link 122 (Figs. 1 and 4) to one arm of another lever 123 pivoted at 124 and having its other arm connected to a rod 125. This rod extends downwardly to a treadle 125$^a$ (Fig. 1) which may be so actuated as to tilt the lever 120 and thus move the wiper 119 either upwardly or downwardly. The wiper 119 is a pressing wiper designed particularly for use in cement lasting shoes when no metallic fasteners are employed and in a preferred construction, as illustrated in Fig. 5, this wiper 119 is provided with an internal heating unit 126 which is supplied with current through suitable flexible conductors, the current being controlled by a switch 127. However, instead of disposing the heating unit within the wiper itself it is contemplated that the wiper may have sliding contact with a fixed part which may be heated in any desired manner, as for example by an electrical heating unit, the latter arrangement avoiding the use of a flexible conductor. The connections between the wiper 119 and the treadle by which it is controlled are so designed that the reciprocation of the wiper is not in any way interfered with, whether the wiper be in its up or inoperative position, or in its down or operative position.

The gearing connections between the various operating instrumentalities are such that the wipers are rapidly reciprocated or vibrated, that is to say, at a rate exceeding 500 and preferably at the rate of 2400 complete reciprocations per minute. The linear speed of the work as caused by the rolls 113 and 114, disregarding slippage, may vary from approximately 50 inches per minute to 250 inches per minute. Three staples per linear inch appear to be good practice and the machine is geared up to this ratio. When the wiper is driven at the rate of 2400 vibrations per minute, the number of wipes per linear inch of movement of the work (disregarding slippage) may vary, for instance, between 9.6 and 48 per inch, while the number of wipes per staple may vary between 3.2 and 16, according to the speed of work fed. This mode of wiping, by a rapidly vibrating wiper, progressing peripherally of the shoe, appears to produce an effect entirely different from that of the usual slowly advanced wiper.

The valve V (Figs. 11, 11$^a$ and 11$^b$) comprises a casing V' into which pressure fluid (for example oil) is delivered by the pump P. A pair of parallel valve stems 130 and 131 are arranged to slide in the valve casing with one end of each stem projecting from the front of the casing. The stem 130 carries a pair of spaced valve pistons which control parts where the pipes 30 and 31 enter the casing, while the stem 131 has spaced valve pistons which control parts where the pipes 30$^a$ and 31$^a$ enter the casing.

From the front of the post or standard 1 projects an elongate tubular bracket 132 (Fig. 1) providing bearings for a slide bar 133 having a crank arm 134 adjustably fixed to its front end, said crank arm being rotatably adjustable upon the bar and being slotted (Fig. 2) for the reception of the screw-threaded stem 135 of a knee pad or actuator 136, the stem 135 being adjustable lengthwise of the slot in the crank arm and also in an axial direction. A compression spring (not shown) within the hollow member 132 tends to move the bar 133 to the right as viewed in Fig. 1. At a point within the standard 1 the bar 133 is provided with a block 137 (Figs. 11, 11$^a$ and 11$^b$) in which are formed a pair of bores 138 and 139 which are aligned with the valve stems 130 and 131, respectively. Each bore 138 and 139 houses a compression spring and forms a guide for a valve-stem actuating pin 140 and 141, respectively. The pin 140 normally projects further out from the side of the block than does the pin 141 so that as the bar 133 is pushed rearwardly, the pin 140 first engages the valve stem 130 and pushes the latter rearwardly thereby so moving the valve pistons carried by said stem as to allow pressure fluid from a chamber $V^m$ in the valve casing to enter the pipe 30 while at the same time permitting fluid to exhaust from the pipe 31 into a chamber $V^n$ in the casing. Fluid is thus allowed to enter the lefthand end of the cylinder 29 (Fig. 6) thereby rocking the lever 23 and clutching the shaft 9 to the pulley 10. The machine is thus started (in so far as the operation of the rolls 113 and 114, and the wipers 36 and 119 is concerned) and if the shoes are to be lasted by the cement process, this is all that is necessary. However, if it be desired to insert fasteners, the knee pad 136 is pushed still further to the rear, thus causing the pin 141 to engage the valve stem 131 and so operate the valve pistons carried by the latter as to allow pressure fluid to enter the pipes $30^a$ and to exhaust from pipe $31^a$. The piston in cylinder $52^f$ is thus caused to move up, thereby rocking the lever arm 52 so as to withdraw the wedge $52^b$ from the shoulder $46^x$ of pin 46 and allowing the pin 46 to clutch the shaft $42^a$ to the worm wheel 42, whereby the fastener forming, feeding and inserting means is set into operation. Release of pressure upon the pad 136 acts in reverse order to stop the fastener applying mechanism and thereafter to stop the other operative instrumentalities of the machine, although the motor may still continue to run.

Within the hollow post 1 there is arranged a reservoir 150 (Fig. 11) from which a pipe 151 leads to the intake of the pump P. The delivery pipe 152 from the pump leads to chamber $V^m$ of the valve casing, while an exhaust pipe 153 leads from the chamber $V^n$ of the casing to the reservoir. If desired, the delivery pipe 152 may be furnished with a pressure relief valve $152^x$.

As above noted, the principal bearings of the machine are designed for forced lubrication. Thus, for example, the elongate bearing 142 in which the shaft $42^a$ turns is provided with a threaded socket 143 for the reception of an oil supply pipe, not shown, leading from the pump P; similar threaded sockets for oil supply pipes are indicated by way of example at $143^a$, $143^b$ and $143^c$.

A bracket 154 is secured to the front of the standard or post 1 (Fig. 1) and supports a table 155 having a drawer 156 beneath it. The table carries a jack 157 for convenience in holding a shoe while the upper is adjusted upon the last by the operator preparatory to lasting.

The fastener inserting means above described acts by pressure to insert the fastener, but under some circumstances it may be preferred to insert the fastener by a blow or impact. To this end the mechanism shown in Figs. 17 to $21^a$, inclusive, may be employed. In this arrangement the crank 65 fixed to the shaft $42^a$ (Fig. 4) as above described, is replaced by a crank $65^a$ which is fast to a clutch collar 160 arranged to turn on the right-hand end of the shaft $42^a$. This part of the shaft has a radial slot 161 (Fig. 20) which receives a clutch dog or pin 162 which is urged outwardly by a spring 163. The collar 160 has a notch 164 (Fig. $19^a$) into which the dog 162 may be projected by the spring, thereby to lock the collar 160 to the shaft. The dog 162 is of an axial width greater than the axial length of the slot 161 and projects beyond the left-hand end of the collar 160 (Fig. 18) and into a cam recess 165 formed in the right-hand end of the bearing 142 in which the shaft $42^a$ turns. This cam recess has a peripheral wall so contoured that when the shaft is at one point of its rotation the dog 162 is free to move outwardly into the deepest part of the cam recess, thus permitting the dog to enter the notch 164 in the collar 160 and thereby lock the collar to the shaft. However, as the shaft turns, the dog encounters the inclined cam portion 165 of the wall of the recess and is thereby forced inwardly so as to disengage the dog 162 from the notch 164. As the dog leaves the notch 164, the crank $65^a$ becomes free to turn relatively to the shaft.

The crank $65^a$ is connected by a connecting rod $66^a$ (Fig. 17) to the cross-head $68^a$ which corresponds in function and in general construction to the cross-head 68 of Fig. 4. However, the cross-head $68^a$ is provided with counterbores concentric with the guide rods 69 and 70 for the reception of the lower ends of compression springs 166 and 167 whose upper ends bear against fixed parts of the frame. In operation, the rotation of the shaft $42^a$ causes the dog 162 to enter notch 164 in the collar 160, thereby turning the crank $65^a$ and raising the cross-head $68^a$ and compressing the springs 166 and 167. When the dog 162 is forced out of the notch 164, the crank $65^a$ is freed from the shaft $42^a$ and the compressed springs 166 and 167 impart to the cross-head $68^a$ a sudden downward movement, thus causing the driver 71 to set the fastener by impact.

While the clutch device of Figs. 17 and $21^a$ is desirable, it is disclosed merely as exemplifying the common practice, in fastener inserting machines, of using impact driving devices. An equivalent device of the prior art is illustrated in the patent to Ladd No. 584,744, dated June 15, 1897.

Instead of the hydraulic clutch control mechanism above described, electrical means may be employed for the purpose, as illustrated for example in Fig. 22. In this arrangement commercial solenoids S and S' are employed for actuating the levers 23 and 52, respectively. The core rod 168 of solenoid S is connected by a pin and slot connected to the upper arm of lever 23, and a spring 168 tends to move the lever in a direction such as to disengage the corresponding clutch. The core rod 170 of solenoid S' is connected by a pin and slot connection to the lower end of lever 52 and is constantly urged in the direction to release the corresponding clutch device by a spring 171. One terminal of each solenoid is connected to one pole of a source E of electrical energy whose other pole is grounded on the machine frame. From the other terminal of solenoids S and S' wires 172 and 173 extend to elongate fixed contacts 174 and 175, respectively, of a switch device D. A switch block 176 is secured to the rear or inner end of the actuating rod $133^a$ to whose forward end is secured the knee pad $136^a$. A spring 177 tends to force the rod 133 toward the right (Fig. 22). The block 176 carries resilient contact fingers 178 and 179, respectively, of different lengths operative in succession, as the knee pad is forced rearwardly, to engage the fixed contacts 174 and 175, respectively, thereby successively energizing the solenoids S and S'. As the solenoid S is energized, the bar 168 is pulled to the right, thus rocking the lever 23 so as to cause the corresponding clutch elements to engage and start the machine into operation. If the knee pad 136ª be further pushed rearwardly, the solenoid S' is energized, drawing the rod 170 to the right and thereby swinging lever 52 so as to cause the corresponding clutch elements to engage and thereby start the fastener inserting mechanism.

In the operation of the machine, and assuming that metallic fasteners are to be used, the motor 5 is first started, thus driving the pulley 10. Then by means of the knee pad, the valve V is actuated to start the machine. The treadle T is now depressed, thus separating the rolls 113 and 114 and the operator presents the edge of the pulled-over, but unlasted, upper so as to insert the margin of the upper between the rolls 113 and 114 at a selected point in the margin of the upper. For example, if a shoe is to be side lasted only, the point at which the upper is first gripped may be adjacent to the end of the shank at one side of the shoe. On the other hand, if the entire shoe is to be lasted the upper may first be gripped very close to the heel on one side. The treadle is now released, and the material is gripped between the rolls 113 and 114. An upward stress is at once developed together with a forward feeding action, tending to cause the point at which the work is gripped to progress peripherally of the shoe. The upward stress causes the boss 114ª on the roll 114 to engage the bottom of the insole, thus preventing upward movement of the shoe in response to this upward stress so that the upper is pulled very tightly about the last.

During this time the wiper 36 is rapidly vibrating or reciprocating just above the plane of the bottom of the shoe, and in a path just to the rear of the nip of the rolls, in the direction of movement of the shoe. As the shoe is fed or advanced, due to the rotation of the rolls between which the margin is gripped, each portion of the margin of the upper which has been gripped and stressed about the last is released but before it is actually released it is engaged by the rapidly reciprocating wiper 36. The advancing end of the wiper contacts the upper material at a point between the edge of the insole and the point where it is held by the rolls, and the force exerted by the advancing wiper adds substantially to the tensioning of the upper about the last. As the margin of the upper escapes from from the rolls, it is immediately wiped in over the bottom of the last. If fasteners are used, the fastener-forming and inserting means now delivers a fastener into the path of the driver 71, the fastener being thereby driven into the wiped-in marginal material so as permanently to unite the latter to the insole. It is assumed in the above description that the wiper 119 has been thrown upwardly out of action, but if desired this wiper may be allowed to act on the wiped-in and stapled material merely to smooth the latter more snugly against the last bottom, and particularly to smooth down its inner edges. However, ordinarily if staples are being inserted, the wiper 119 will be thrown out of action. On the other hand, if the staple mechanism is inoperative, due to engagement of the wedge element 52ᵇ with the shoulder 46ˣ of pin or dog 46, the wiper 119 is moved down into operative position. It is assumed under these conditions that the margin of the upper or the insole, or both, has previously been coated with adhesive so that after wiping in by the wiper 36, the application of heat, pressure and the rubbing action exerted by the wiper 119 will firmly and permanently unite the upper material to the insole.

It will be understood that during the advance of the point of operation, for example from the rear end of the shank to the forward end of the shank of the shoe, the upper is never wholly released by the gripper rolls 113 and 114, the relative advance of the shoe with respect to the rolls causing a fresh part of the upper to be gripped as fast as a previously gripped and stressed portion is released. This procedure may be continued throughout any part of the periphery of the shoe either for side lasting alone, for toe lasting, or for lasting the entire shoe, as may be desired. It will be observed that this mode of procedure is quite different from previous methods of operation in which the upper was gripped and stressed at a given point, then wholly released from the gripping means and again gripped and stressed at a point appreciably spaced from the first point. The latter mode of action necessarily results in stressing the upper more strongly at the points at which the upper is actually gripped, so that the lasting is not uniform throughout the shoe. However, by the present procedure every part of the upper within the selected portion which is to be lasted, is subjected to substantially the same lasting stress, the point of application of stress advancing by infinitesimal amounts along the margin, so that there is no intervening place, no matter how small, which does not experience the proper lasting stress.

In the foregoing description of the operation it was assumed that metallic fasteners were to be inserted along the entire lasting margin. With that in view the operator would push the knee pad 136ª all of the way in at the beginning of the operation thereby not only clutching the shaft 9 to the pulley 10 so as to drive the rolls and wipers, but also clutching shaft 42ª to gear 42, thereby driving the fastener inserting mechanism. However, if the machine is to be used for cement lasting only the operator would push the knee pad 136ª back only far enough to clutch shaft 9 to pulley 10 so as to drive the rolls and wipers, but to leave the fastener-forming and inserting means idle.

Obviously, if it be desired to insert fasteners at some parts of the shoe and not at others, this is readily accomplished by the proper manipulation of the knee pad while the lasting operation is taking place. Thus, for example, it staples are to be inserted along the shank, the pad is pushed all of the way in, but if the staples are to be omitted at the toe portion of the shoe, the operator permits the pad to move part way forward as the toe is approached in lasting, so that the fastener-inserting means stops functioning, but without interrupting the continued lasting operation. When the staples are again to be inserted the pad is merely pushed back to its rearmost position, thus again causing the fastener-inserting means to function.

While certain desirable arrangements of parts have herein been illustrated and described by way of example, it is to be understood that the invention is not necessarily limited to the precise arrangement herein described and shown, but is to be regarded as broadly inclusive of any and all equivalents and modifications thereof such as fall within the scope of the appended claims.

I claim:
1. A lasting machine comprising a pair of work-gripping rolls, means for driving the rolls in opposite directions, means resiliently urging one roll bodily toward the other, one of said rolls being provided with an axially projecting insole-positioning boss, and means for separating the rolls to permit introduction of the work between them.

2. A lastng machine comprising a pair of work-gripping rolls, a shaft for each roll, bearings for each shaft, the bearings for one shaft being bodily movable thereby to permit one roll to move toward and away from the other roll, resilient means opposing separation of the rolls, a worm gear fixed to the shaft which is mounted in movable bearings, a worm which always meshes with said worm gear, and means for driving the worm.

3. A lasting machine comprising a pair of work-gripping rolls, a shaft for each roll, bearings for each shaft, the bearings for one shaft being bodily movable thereby to permit one roll to move toward and from the other, the shaft which has the movable bearings having a worm gear fixed to it, a pinion fixed to the second roll shaft, a third shaft parallel to said latter roll shaft, said third shaft having a pinion which meshes with the pinion on the second roll shaft and also having fixed to it a worm gear, a worm which always meshes with both worm gears, and means for driving the worm.

4. A lasting machine having in combination a pair of work-gripping rolls, a reciprocating lasting-in wiper, a pressing wiper operative to exert pressure upon the wiped-in material when adhesive is employed for uniting the upper to the insole, a main drive shaft, connections actuated by the drive shaft for operating the rolls and both wipers, and means actuable by the operator for rendering inoperative the pressing wiper while the rolls and in-wiping wiper continues to operate.

5. A lasting machine having in combination a pair of work-gripping rolls, a reciprocating lasting-in wiper, a pressing wiper operative to exert pressure upon the lasted-in upper material when adhesive is employed for uniting the upper material to the insole, staple-driving means, a main drive shaft, connections actuated by the main drive shaft for concomitantly operating the rolls, both wipers and the staple-driving means, and means actuable by the operator for stopping the operation of either or both the pressing wiper and the staple-driving means while the rolls continue to operate.

6. A lasting machine comprising a pair of oppositely turning work-gripping rolls operative to grip the margin of the shoe upper while lasting stress is being applied to the upper, an in-wiping wiper, means operative to vibrate said wiper back and forth in a predetermined path so located that the wiper engages the marginal material of the upper immediately after it is gripped by the rolls, a work-pressing wiper, means whereby said work-pressing wiper is also vibrated, and means operative to move said work-pressing wiper out of work-engaging position while it still continues to vibrate.

7. A lasting machine comprising a pair of oppositely turning work-gripping rolls operative to grip the margin of the shoe upper while lasting stress is being applied to the upper, a wiper for wiping in the marginal material of the shoe upper, means operative to move said wiper back and forth in a path so located that the wiper engages the marginal material of the upper immediately after it has been gripped by the rolls, a work-pressing wiper which reciprocates in time with the first-named wiper, and means operative to supply heat to the work-pressing wiper while it is reciprocating.

8. A lasting machine comprising a pair of oppositely turning work-gripping rolls operative to grip the margin of the shoe upper while the lasting stress is being applied to the upper, a reciprocating wiper, means for reciprocating said wiper in a path so located that it engages the marginal portion of the upper immediately after the latter has been gripped by the rolls, a work-pressing wiper connected to the first-named wiper so as to reciprocate with the latter, and manually actuable means operative to move the pressing wiper out of work-engaging position while permitting it to continue to reciprocate.

9. A lasting machine comprising a pair of oppositely turning work-gripping rolls operative to grip the margin of the shoe upper while lasting stress is being applied to the upper, a vibrating wiper, means operative to move said wiper forwardly and backwardly thereby to wipe in the marginal portion of the upper, a work-pressing wiper pivotally secured to the first-named wiper so as to partake of the backward and forward movement of the latter, manually actuable means for swinging said work-pressing wiper about its pivot thereby to move it out of work-engaging position, the means for moving the work-pressing wiper into and out of work-engaging position comprising parts so constructed and arranged as to allow the pressing wiper to continue freely to move backwardly and forwardly when in either the operative or inoperative position.

10. A lasting machine comprising a pair of work-gripping rolls, a drive shaft, and means for transmitting motion from the drive shaft to the rolls, said motion-transmitting means including a clutch, a motor device, means actuated by the motor device for shifting the clutch thereby to stop or start the rolls, and means operative to cause said motor device to act.

11. A lasting machine comprising a pair of oppositely turning work-gripping helically ribbed rolls of opposite pitch, a wiper, means for guiding the wiper to move in a predetermined path, and means operative to vibrate the wiper at a rate exceeding 100 vibrations per minute while the work is gripped between the rolls.

12. A lasting machine comprising a narrow wiper, means guiding the wiper to move in a path transverse of the edge of the last bottom, feed rolls operative uninterruptedly to progress the work relative to the path of the wiper, and means operative to vibrate the wiper in said path at a speed exceeding 500 vibrations per minute.

13. A lasting machine comprising work-gripping and stressing rolls, in-wiping means, fastener-inserting means, a drive shaft, and means for transmitting motion between the drive shaft, rolls, wipers and fastener-inserting means, said motion-transmitting means comprising a clutch device constructed and arranged to permit the fastener-inserting means to be stopped without affecting the operation of the rolls and wiping means, and means for actuating said clutch device.

14. A lasting machine comprising work-gripping and stressing rolls, in-wiping means, and fastener-inserting means, said fastener-inserting means comprising a reciprocating cross-head, a fastener-driving element fixed to one end of the cross-head, said driving element being designed to move in a path closely adjacent to the point at which the rolls grip the work, a fastener-forming element carried by the other end of the cross-head, a fastener-advancing element, and means carried by the cross-head for actuating said advancing element.

15. A lasting machine comprising work-gripping rolls, in-wiping means, and fastener-inserting means, said fastener-inserting means comprising a reciprocating cross-head, a fastener-driving element, and wire-cutting and forming means carried by the cross-head, a fixed die with which the forming means cooperates to sever a length of wire and form it into a staple, a staple-advancing element operative to move the formed staple from the dies to the path of the driving element, a cam carried by the cross-head, a lever actuated by the cam thereby to move the advancing element, and means providing a raceway for staples on their way from the dies to the path of the driving element.

16. A lasting machine comprising work-gripping rolls, in-wiping means, and fastener-inserting means, said fastener-inserting means comprising a reciprocating part, a fastener-driving element carried by said part, staple-forming means including a die carried by said part, means for intermittently advancing a length of wire into the field of operation of the forming means, a rotating shaft, means carried by the shaft for moving said reciprocating part, means carried by the shaft for actuating the wire-advancing means, and means for turning the shaft including a clutch device so designed and arranged as to permit stopping of the wire-feeding and staple-forming means without stopping the rolls or wiping means.

17. A lasting machine comprising a drive shaft, upper-gripping means, fastener-inserting means, clutch connections operative to control the action of the gripping means, clutch connections operative to control the action of the fastener-inserting means, and means including a single operator-actuated part operative to cause the respective clutch connections to become active successively.

18. A lasting machine comprising drive means, upper-gripping and stressing means, fastener-inserting means, and means, including a single operator-actuated part, operative successively to connect the stressing means and the inserting means, respectively, to the drive means so as to be driven by the latter.

19. A lasting machine comprising drive means, a pump driven thereby, upper-gripping and stressing means, fastener-inserting means, connections, including a pair of clutch devices, for actuating the stressing and inserting means, respectively, a fluid motor for controlling each clutch device, and means, including a valve and a single operator-actuated valve-controlling element, operative to determine the delivery of pressure fluid from the pump to the respective fluid motors.

20. A lasting machine comprising an upper tensioning wiper, a pair of work gripping feed rolls operative to grip the margin of the upper material between them and uninterruptedly to progress the work relative to the path of the wiper, means operative to guide the tensioning wiper so as to move in a path such that it engages the marginal material just to the rear of the nip of the rolls, referred to the direction of advance of the work, and between the insole and the point where the work is gripped between the rolls, and means operative rapidly to vibrate the wiper in such path whereby its engagement with the marginal material tensions the latter and tends to wipe it in over the insole.

21. A lasting machine comprising a narrow in-wiping wiper, means operative to vibrate the wiper at a speed exceeding 100 vibrations per minute, a pair of oppositely turning feed rolls operative to grip the margin of the shoe upper while lasting stress is being applied thereto, said rolls being operative uninterruptedly to progress the work relative to the path of the wiper, and guiding means operative to guide the wiper in a path so located that the wiper engages the marginal material immediately after it is gripped between the rolls.

22. A lasting machine comprising a pair of oppositely turning work gripping rolls operative to grip the margin of the shoe upper while lasting stress is being applied to the upper, a wiper for wiping in the marginal material of the shoe upper, means operative rapidly to move said wiper back and forth in a path so located that the wiper engages the marginal material of the upper immediately after it has been gripped by the rolls, and pressing means engageable with the marginal material after the latter has been acted upon by the wiper, said presser means being operative to force the marginal material firmly against the under surface of the insole.

JACOB S. KAMBORIAN.